United States Patent
Wier

[19]

[11] Patent Number: 6,135,564
[45] Date of Patent: Oct. 24, 2000

[54] FORCE LIMITER FOR A VEHICLE OCCUPANT RESTRAINT SYSTEM

[75] Inventor: Franz Wier, Göggingen, Germany

[73] Assignee: TRW Occupant Restraint Systems GmbH & Co. KG, Alfdorf, Germany

[21] Appl. No.: 09/175,497

[22] Filed: Oct. 20, 1998

[30] Foreign Application Priority Data

Oct. 21, 1997 [DE] Germany ............... 297 18 661 U

[51] Int. Cl.[7] .................................................. B60R 21/00
[52] U.S. Cl. ............................................. 297/472; 280/805
[58] Field of Search .................................. 297/464, 480, 297/470, 471, 472, 216.1; 280/805, 806; 188/371

[56] References Cited

U.S. PATENT DOCUMENTS 3,917,031 11/1975 Doin et al. .
4,373,748 2/1983 Reid et al. .
4,385,775 5/1983 Shimogawa et al. .
5,340,152 8/1994 Fohl .

*Primary Examiner*—Milton Nelson, Jr.
*Attorney, Agent, or Firm*—Tarolli, Sundheim, Covell, Tummino & Szabo L.L.P.

[57] ABSTRACT

A force limiter in a vehicle occupant restraint system comprises a tube, a piston displaceably arranged in the tube, a traction and thrust devices connected with the piston element, and at least one roller body. The piston has a stop provided thereon and a radial exterior with at least one ramp surface. The roller body on displacement of the piston in a direction of movement travels along the ramp surface up to the stop and is pressed radially outwards into a wall and plastically deforms the wall. The stop has an extension which protrudes in the direction of movement and extends radially outside a point of the roller body which lies furthest opposed to the direction of movement.

20 Claims, 4 Drawing Sheets

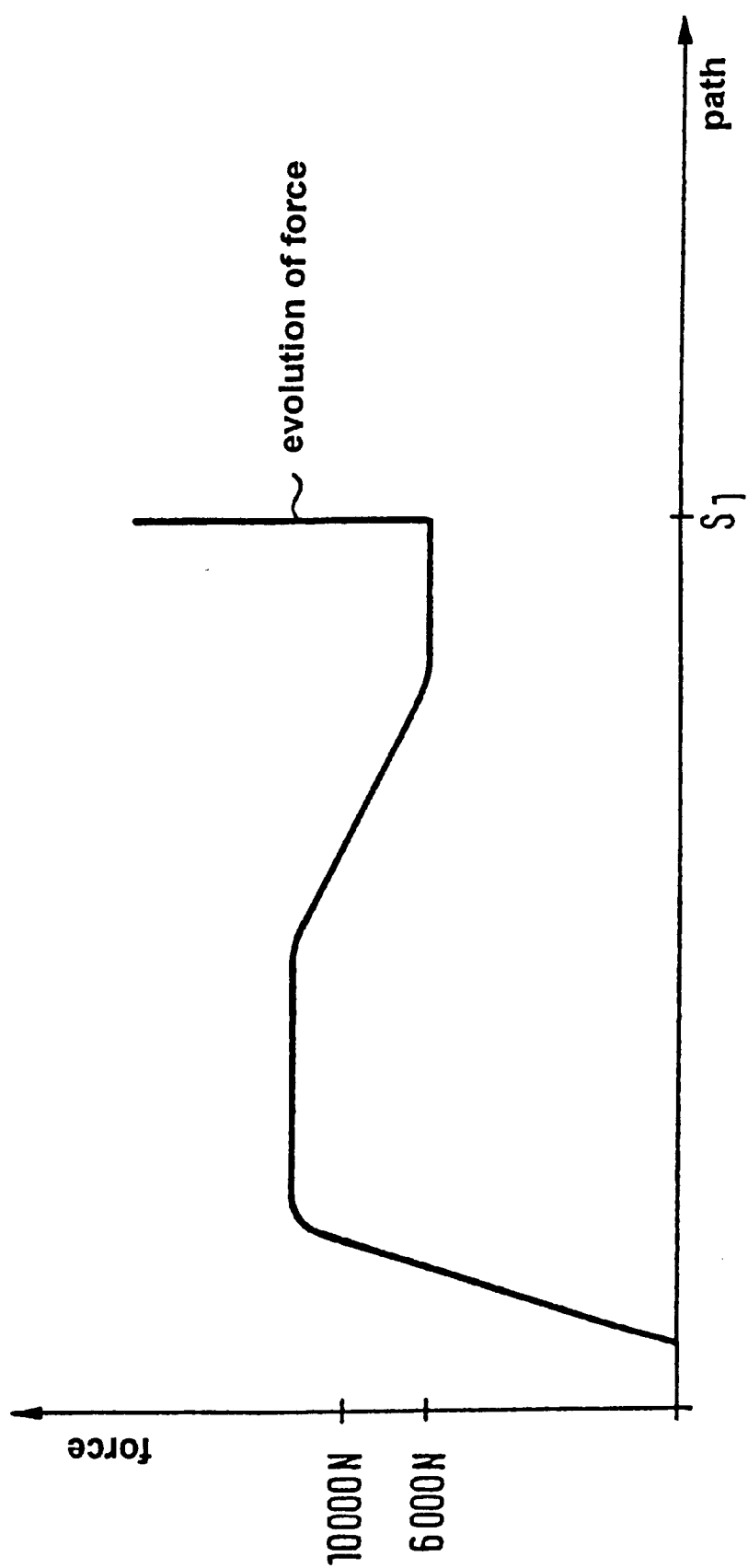

FORCE LIMITER FOR A VEHICLE OCCUPANT RESTRAINT SYSTEM

FIELD OF THE INVENTION

The invention relates to a force limiter for a vehicle occupant restraint system.

BACKGROUND OF THE INVENTION

A force limiter has the task of reducing load peaks in a safety belt system during the forward displacement of a vehicle occupant in the case of a vehicle impact. The use of such a force limiter is particularly effective in combination with a belt tensioner, which eliminates the belt slack, before the forward displacement of the vehicle occupant begins.

In the force limiters hitherto, the evolution of force over the path is only able to be predetermined within very rough limits, because despite small manufacturing tolerances with the same model it fluctuates from one force limiter to the other.

DE 42 06 117 C2 discloses a force limiter in a vehicle occupant restraint system, which comprises a tube, a piston element displaceably arranged in the tube and which is connected with a traction and thrust means and has a radial exterior having at least one ramp surface, and which further comprises at least one roller body which on displacement of the piston element in a direction of movement travels along the piston element up to a stop provided on the piston element, the at least one roller body being pressed radially outwards into a wall, plastically deforming the wall.

SUMMARY OF THE INVENTION

The invention provides a force limiter in which the evolution of force which is able to be achieved by the limiter is able to be predetermined in very close limits, without this being at the expense of a substantially increased manufacturing expenditure. The force limiter according to the invention comprises a tube, a piston element displaceably arranged in the tube, a traction and thrust means connected with the piston element, and at least one roller body. The piston element has a stop provided thereon and a radial exterior with at least one ramp surface. The roller body on displacement of the piston element in a direction of movement travels along the ramp surface up to the stop and is pressed radially outwards into a wall and plastically deforms the wall. The stop has an extension which protrudes in the direction of movement and extends radially outside a point of the roller body which lies furthest opposed to the direction of movement.

Due to the provision of such an extension, the radial displacement of the roller body is limited and a so-called "overtravel" of the stop by the roller body is prevented. In force limiters hitherto, it could in fact happen that the roller body bored into the wall too deeply radially outwards, so that a higher force transferred between the traction and thrust means and the tube, the roller body traveled over the stop and hence as a whole transferred too small a force.

Preferably, when viewed in longitudinal section, the stop together with the extension have a shape substantially adapted to that of the roller body. The roller body is a ball or a roll, so that the ramp surface is a conical surface or a ramp surface.

The evolution of the restraining force, due to deformation of the wall, drops again after reaching a first maximum. Such an evolution of force is advantageous because the body of the occupant is initially restrained with a relatively great force and finally is gently decelerated. Preferably, the wall which is to be plastically deformed is dimensioned such that the first maximum of the restraining force is below approximately 9000 N and then, after exceeding the first maximum, is limited to values between 3000 and 6000 N. The special factor in the force limiter according to the invention is, inter alia, the fact that almost all roller bodies rest against the stop at relatively low forces of 3000 to 12000 N. The early positioning of the roller body against the stop thus leads to an evolution of force which is able to be predetermined in close limits.

The wall which is to be plastically deformed can be the tube itself, which may have different wall thicknesses and/or different hardnesses in various sections, in order to determine the evolution of the transferable force.

Furthermore, it is also possible to insert rings into the tube which are plastically deformed by the roller body. These rings may be different in thickness or in hardness.

Finally, it is also conceivable to place further elements externally onto the tube, for example by turning them up or shrinking them on, so that the elasticity of the wall and the resistance to plastic deformation is increased as compared to the wall of the tube without such a body placed thereon.

BRIEF DESCRIPTION OF THE DRAWINGS

FIG. 4 shows a force/path diagram of the force limiter according to the invention.

DETAILED DESCRIPTION OF THE PREFERRED EMBODIMENTS

Figure 1:
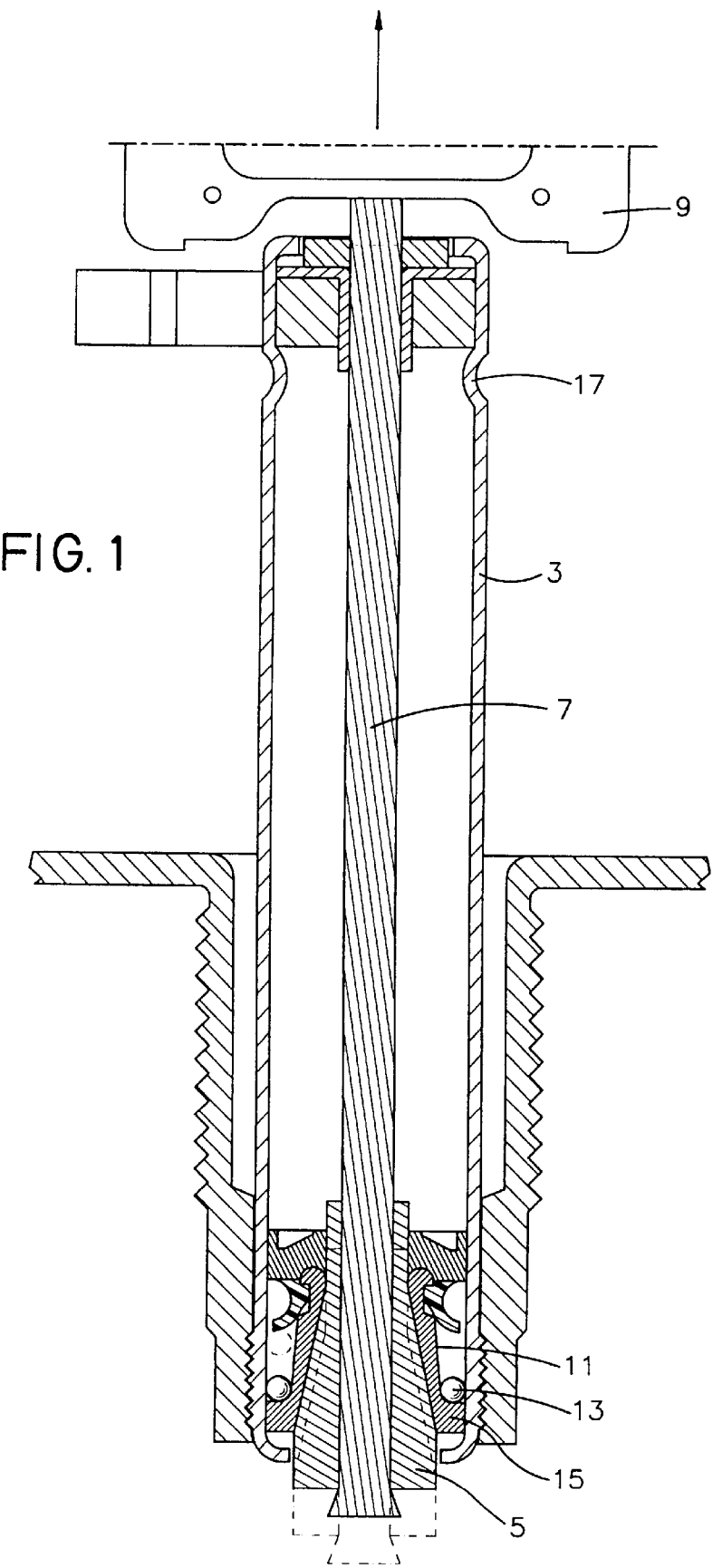
FIG. 1 shows a longitudinal section through a belt tensioner with an integrated force limiter according to the invention in accordance with a first embodiment.

The invention will now be described in detail with reference to the embodiments shown in the drawings.

In FIG. 1 a pyrotechnic belt tensioner is shown, more precisely a buckle tensioner having a piston/cylinder drive. A force limiter is integrated into the belt tensioner. This force limiter consists of a tube 3 which also forms the cylinder of the belt tensioner, and a piston element 5 arranged displaceably therein, which piston element 5 forms the piston of the belt tensioner. A traction means 7 connects the piston element 5 with the indicated belt buckle 9. The outer surface of the lower section of the piston element 5, shown in FIG. 1, is constructed conically to form a ramp surface 11, on which several roller bodies in the form of balls lie distributed over the periphery. In FIG. 1 the belt tensioner is illustrated after tensioning has been completed, at a moment as the occupant moves forward and applies a high tensile force onto the belt. Thereby, the piston element 5 moves in a direction of movement, also designated the effective direction of the force limiter, which is indicated by the arrow and which is opposed to the tensioning direction. With this movement of the piston element 5 in arrow direction, the roller bodies 13 travel on the ramp surface 11 until striking onto a stop 15. In so doing, the roller bodies 13 are pressed radially outwards into the wall of the tube 3 and deform it in a plastic manner, whereby energy is reduced.

As can be seen from FIG. 1, the wall is relatively thick towards the bottom and decreases towards the top until finally an indentation 17 with a great wall thickness is present. As a thicker wall offers more resistance than a thin wall to the plastic deformation, by means of the profile of the thickness of the wall, the evolution of the force transferred between the piston element 5 and the tube 3, which force forms the restraining force, can also be predetermined relatively exactly. Owing to the profile of the wall 3 illustrated in FIG. 1, initially a high restraining force is provided, which decreases until finally on reaching the indentation 17 a type of stop is present, so that no further displacement of the piston element 5 is possible.

The corresponding evolution of the curve is illustrated in FIG. 4, in which one can see from this curve that after a rise of the restraining force up to a first maximum of less than 10000 N, a drop occurs to approximately 6000 N, until with the distance S1 covered, the stop in the form of the indentation 17 is reached by the roller bodies 13. Already during the rising phase up to the reaching of the first maximum, all roller bodies 13 travel up to abutment against the stop.

In addition to the different wall thickness, a hardening of the wall in sections can also influence the evolution of the curve. For example, the tube 3 can be hardened by so-called laser hardening in particular regions, for example in the lower region, or it can be treated thermally, so that in this region the wall offers a high resistance to the plastic deformation and a high restraining force is achieved. By this defined hardening in specific regions it is also possible to provide a tube with a uniform wall thickness and nevertheless to achieve a non-constant restraining force over the distance.

Figure 2:
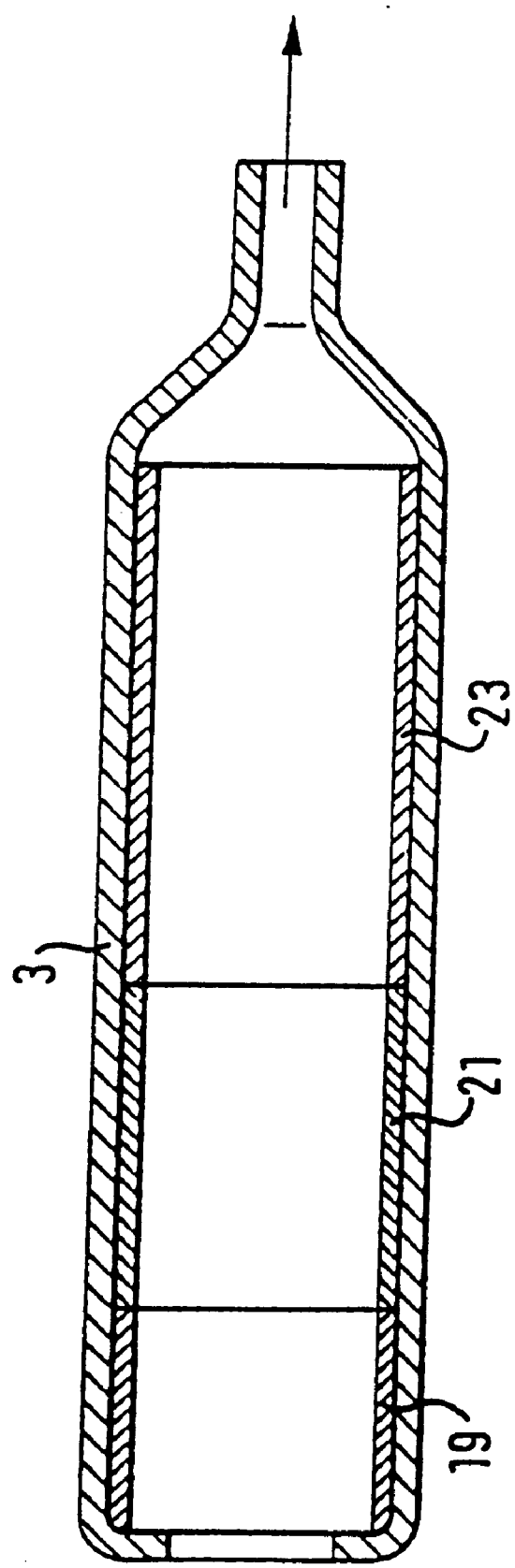
FIG. 2 shows only the tube of the belt tensioner according to a second embodiment, into which rings, adjoining each other, are inserted.

In the embodiment illustrated in FIG. 2, the evolution of force is not controlled by altering the tube geometry or hardness of the tube, but rather by rings 19, 21 and 23 of differing hardness, which are inserted into the tube and adjoin each other. The ring 19, which will be deformed first on forward displacement of the occupant, is hardest and the ring 21 adjoining thereto is the softest.

In addition, it is also possible to shrink elements corresponding to rings 19, 21 and 23 externally onto the tube, in order to alter the elasticity of the tube 3.

So that it is prevented that the roller bodies 13 are urged too far radially outwards and possibly even travel over the stop 15, the stop 15 has an extension 25 formed on it in one piece. The extension 25 provides for the roller bodies 13, in the locked position shown in FIG. 3, to be fixed in position both in axial and also in radial direction on the ramp surface 11 with applications of force in arrow direction. For this, the extension 25 protrudes in the direction of movement radially outside the point 27 of the roller body which lies furthest opposed to the direction of movement.

Figure 3:
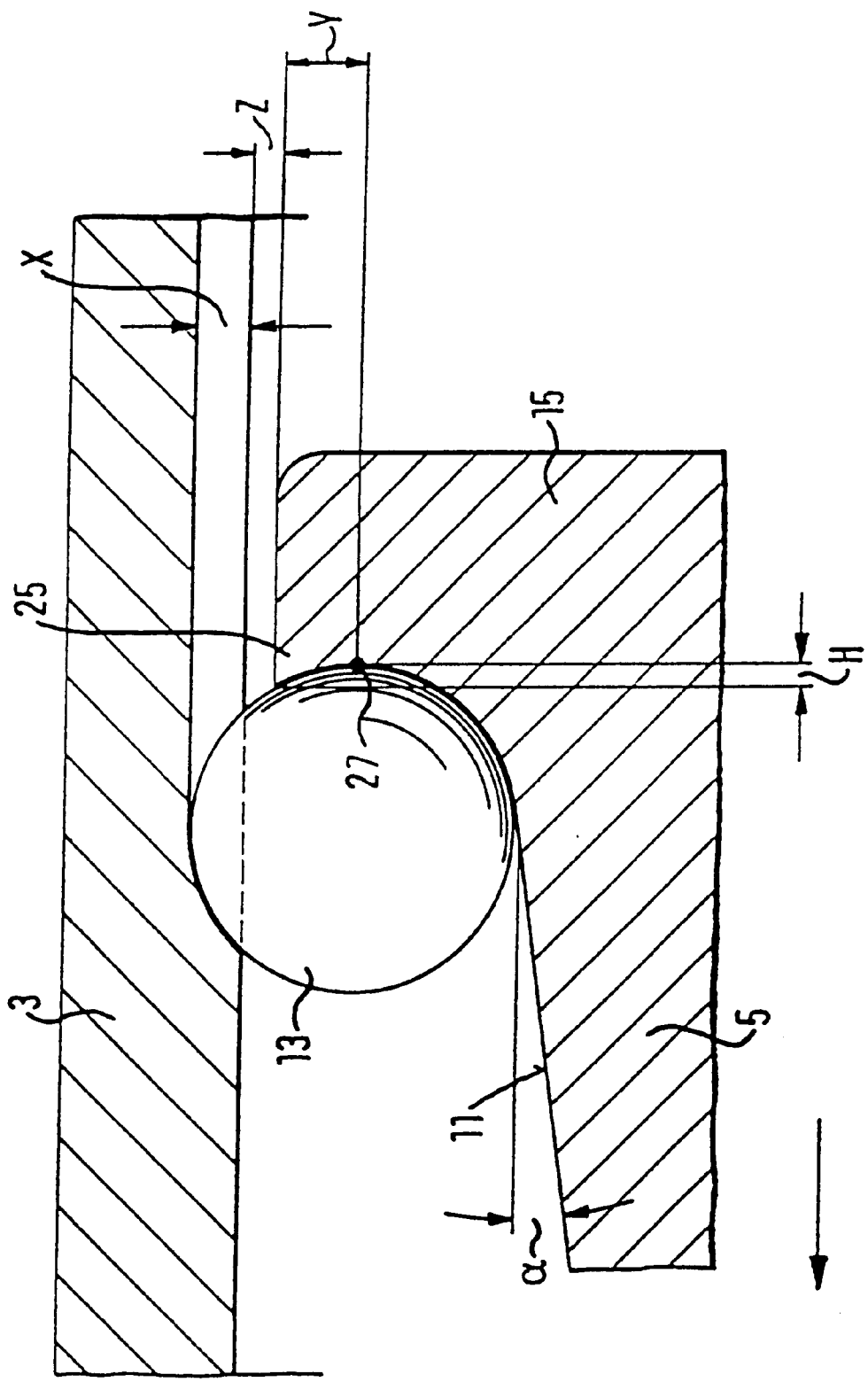
FIG. 3 shows an enlarged sectional view of a roller body which is partially pressed into the wall of the tube, in locked state.

As can be seen from FIG. 3, for the optimum fixing in position of the roller bodies 13, the stop 15 together with the extension 25 is adapted to the shape of the roller body 13, viewed in longitudinal direction. Also the angle a of the ramp surface to the axial direction influences the evolution of the curve and the movement of the roller bodies 13 on the ramp face 11. The angle a between the ramp surface and the axial direction amounts to less than 70°. The ramp surface is additionally coated with a lubricant in order to facilitate the displacement of the roller bodies 13 on it. H designates the axial distance between the maximum protruding point of the extension 25 to the point 27. The measure X indicates the maximum depth of penetration of the roller body 13 into the wall of the tube 3, the measure Y indicates the radial distance between the radially outermost point of the extension 25 and the point 27, and the measure Z indicates the gap width between the extension 25 and the inner face, which is not deformed, of the tube 3.

The measure X amounts to less than approximately one quarter of the diameter of the roller body, and the surfaces against which the roller bodies lie have a roughness of less than $R_z7$.

Through the previously described geometry and surface design, the evolution of the restraining force is able to be predetermined in close limits.

What is claimed is:

1. A force limiter in a vehicle occupant restraint system, said force limiter comprising
    a tube,
    a piston element displaceably arranged in said tube,
    a traction and thrust means connected with said piston element, and
    at least one roller body,
    said piston element having a stop provided thereon and a radial exterior with at least one ramp surface,
    said roller body on displacement of said piston element in a direction of movement traveling along said ramp surface up to said stop and being pressed radially outwards into a wall and plastically deforming said wall, and
    said stop having an extension which protrudes in said direction of movement and extends radially outside a point of said roller body which lies furthest opposed to said direction of movement.

2. The force limiter as claimed in claim 1, wherein, when viewed in a longitudinal section, said stop together with said extension have a shape substantially adapted to that of said roller body.

3. The force limiter as claimed in claim 1, wherein said roller body is a ball.

4. The force limiter as claimed in claim 1, wherein said roller body is a cylindrical roll.

5. The force limiter as claimed in claim 1, wherein said force limiter is adapted to achieve an evolution of a restraining force which drops after reaching a first maximum.

6. The force limiter as claimed in claim 1, wherein said force limiter is part of a belt tensioner in the form of a piston/cylinder drive, and wherein said tube forms a cylinder and said piston element forms a piston of said piston/cylinder drive.

7. The force limiter as claimed in claim 1, wherein said roller body rests against said stop at forces as low as between 3000 N and 12000 N.

8. The force limiter as claimed in claim 1, wherein said wall which is to be plastically deformed is said tube itself.

9. The force limiter as claimed in claim 1, wherein elements are placed externally onto said tube for achieving a non-constant evolution of said restraining force.

10. The force limiter as claimed in claim 1, wherein rings are inserted into said tube which are plastically deformed by said roller body.

11. The force limiter as claimed in claim 10, wherein a plurality of rings having differing hardness are inserted into said tube.

12. A force limiter in a vehicle occupant restraint system, said force limiter comprising:
    a tube;
    a piston element displaceably arrange in said tube;
    a traction and thrust means connected with said piston element; and
    at least one roller body;

said piston element having a stop provided thereon and a radial exterior with at least one ramp surface;

said roller body on displacement of said piston element in a direction of movement traveling along said ramp surface up to said stop and being pressed radially outwards into a wall and plastically deforming said wall; and said stop having an extension which protrudes in said direction of movement and extends radially outside a point of said roller body which lies furthest opposed to said direction of movement, said wall which is to be plastically deformed being said tube itself, a restraining force exhibiting an evolution at least codetermined by sections of said wall having different hardness.

13. The force limiter as claimed in claim 12, wherein a plurality of rings having differing hardness are inserted into said tube which are plastically deformed by said roller body.

14. The force limiter as claimed in claim 12, wherein further bodies are placed externally onto said tube for achieving a non-constant evolution of said restraining force.

15. The force limiter as claimed in claim 12, wherein said force limiter is part of a belt tensioner in the form of a piston/cylinder drive, and wherein said tube forms a cylinder and said piston element forms a piston of said piston/cylinder drive.

16. A force limiter in a vehicle occupant restraint system, said force limiter comprising:

a tube;

a piston element displaceably arrange in said tube;

a traction and thrust means connected with said piston element; and at least one roller body;

said piston element having a stop provided thereon and a radial exterior with at least one ramp surface;

said roller body on displacement of said piston element in a direction of movement traveling along said ramp surface up to said stop and being pressed radially outwards into a wall and plastically deforming said wall; and said stop having an extension which protrudes in said direction of movement and extends radially outside a point of said roller body which lies furthest opposed to said direction of movement, said force limiter being adapted to achieve an evolution of a restraining force which drops after reaching a first maximum, and said wall which is to be plastically deformed being dimensioned such that said first maximum of said restraining force is below approximately 10,000 N.

17. The force limiter as claimed in claim 16, wherein said wall which is to be plastically deformed is said tube itself.

18. The force limiter as claimed in claim 16, wherein after exceeding said first maximum, said restraining force is limited to values between 3000 N and 6000 N.

19. A force limiter in a vehicle occupant restraint system, said force limiter comprising:

a tube;

a piston element displaceably arranged in said tube;

a traction and thrust means connected with said piston element; and at least one roller body;

said piston element having a stop provided thereon and a radial exterior with at least one ramp surface;

said roller body on displacement of said piston element in a direction of movement traveling along said ramp surface up to said stop and being pressed radially outwards into a wall and plastically deforming said wall; and said stop having an extension which protrudes in said direction of movement and extends radially outside a point of said roller body which lies furthest opposed to said direction of movement, said wall which is to be plastically deformed being said tube itself, a restraining force exhibiting an evolution at least codetermined by different wall thicknesses.

20. The force limiter as claimed in claim 19 wherein rings are inserted into said tube which are plastically deformed by said roller body.

\* \* \* \* \*